(12) United States Patent
Sander et al.

(10) Patent No.: US 9,654,016 B2
(45) Date of Patent: May 16, 2017

(54) STEP-UP OR STEP-DOWN CONVERTER COMPRISING A BYPASS CAPACITOR

(71) Applicant: SMA Solar Technology AG, Niestetal (DE)

(72) Inventors: Stephan Sander, Friedland (DE); Artjom Gruber, Fuldabrueck (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 14/931,324

(22) Filed: Nov. 3, 2015

(65) Prior Publication Data
US 2016/0056726 A1 Feb. 25, 2016

Related U.S. Application Data

(63) Continuation of application No. PCT/EP2014/059103, filed on May 5, 2014.

(30) Foreign Application Priority Data

May 3, 2013 (DE) ........................ 10 2013 104 529

(51) Int. Cl.
*H02M 3/158* (2006.01)
*H02M 3/335* (2006.01)
(Continued)

(52) U.S. Cl.
CPC ....... *H02M 3/33546* (2013.01); *H02M 3/156* (2013.01)

(58) Field of Classification Search
CPC ........ H02M 1/34; H02M 3/156; H02M 3/158; H02M 3/1588; H02M 3/1584; H02M 2001/346; H02M 2001/348
See application file for complete search history.

(56) References Cited

U.S. PATENT DOCUMENTS

| 4,899,270 A | 2/1990 | Bond |
| 7,161,331 B2 * | 1/2007 | Wai ........................ H02M 1/34 323/222 |

(Continued)

FOREIGN PATENT DOCUMENTS

| DE | 19750041 C1 | 1/1999 |
| DE | 10103633 A1 | 8/2002 |

(Continued)

OTHER PUBLICATIONS

International Search Report, Application No. PCT/EP2014/059103, dated May 30, 2014.

*Primary Examiner* — Gary L Laxton
(74) *Attorney, Agent, or Firm* — Eschweiler & Potashnik, LLC (57) ABSTRACT

A converter includes a converter inductor, a converter diode, and a converter switch, wherein the converter inductor, the converter diode and the converter switch operate together to receive an input voltage and generate a converted output voltage. The converter further includes a bypass circuit that is connected in parallel with the converter switch; the bypass circuit includes a bypass capacitor connected in series with a diode, wherein a forward direction of the diode is the same as a regular direction of current flow through the converter switch. The converter also includes a discharge circuit configured to discharge the bypass capacitor, wherein the discharge circuit includes an inductor. The inductor of the discharge circuit is magnetically coupled to the converter inductor.

18 Claims, 4 Drawing Sheets

(51) Int. Cl.
*H02M 3/156* (2006.01)
*H02M 1/34* (2007.01)

(56) References Cited

U.S. PATENT DOCUMENTS

| | | | |
|---|---|---|---|
| 7,183,753 B2 | 2/2007 | Tsuruya | |
| 7,385,833 B2 * | 6/2008 | Keung | H02M 3/158 323/222 |
| 7,915,872 B2 * | 3/2011 | Lee | H02M 3/155 323/222 |
| 8,378,647 B2 * | 2/2013 | Yonezawa | H02M 1/4225 323/222 |
| 8,929,112 B2 | 1/2015 | Schill | |
| 2006/0262577 A1 | 11/2006 | Schenk | |
| 2006/0274558 A1 | 12/2006 | Keung | |
| 2008/0169792 A1 * | 7/2008 | Orr | H02M 3/155 323/222 |

FOREIGN PATENT DOCUMENTS

| | | |
|---|---|---|
| EP | 1519475 A1 | 3/2005 |
| EP | 2437386 A1 | 4/2012 |
| JP | 2008099421 A | 4/2008 |

* cited by examiner

STEP-UP OR STEP-DOWN CONVERTER COMPRISING A BYPASS CAPACITOR

CROSS REFERENCE TO RELATED APPLICATIONS

This application claims priority to International Patent Application number PCT/EP2014/059103, filed on May 5, 2014, which claims priority to German Patent Application number 10 2013 104 529.4, filed on May 3, 2013, and is hereby incorporated in its entirety.

FIELD

The disclosure relates to a converter, in particular a step-up converter (SUC) or a step-down converter (SDC), having a converter inductor, a converter diode, a converter switch and a bypass circuit connected in parallel with the converter switch.

BACKGROUND

In a conventional step-up converter, an SUC inductor is connected in series with an SUC diode in one of two lines connected to a DC voltage source. Downstream of the SUC diode, an intermediate circuit capacitor is connected between the two lines, to which intermediate circuit capacitor an output voltage, which has been stepped up in comparison with its input voltage by the step-up converter, is applied. Between the SUC inductor and the SUC diode, a shunt branch, in which an SUC switch is arranged, leads from the one line to the other line. Closing the SUC switch applies the input voltage directly to the SUC inductor in order to energize the SUC inductor with a large current flowing through the SUC switch. After the SUC switch has been opened, this energy is output to the intermediate circuit capacitor with a higher voltage by the SUC diode.

A plurality of parallel partial converters are provided in a step-up converter known from DE 101 03 633 A1. The partial converters charge a common intermediate circuit capacitor and each have a series circuit comprising an SUC inductor and an SUC diode and a shunt branch that branches off in between them and has an SUC switch. Therein, the individual SUC switches are each controlled for intermittent operation of the current flowing through the associated SUC inductors. This means that the current through the respective SUC inductor is zero at the time at which the associated SUC switch is closed and returns to zero again after the associated SUC switch has been opened again and before it is closed again. During this intermittent operation, switch-on losses of SUC switches in the form of IGBT semiconductor switches and also switch-off losses of the SUC diodes are minimized in an advantageous way. However, as a result of the fact that high currents are switched off using the SUC switches during intermittent operation, relatively high switch-off losses occur in the SUC switches even if they do not use up the minimization of the other switching losses. Current ripple is reduced in the known step-up converter by controlling the SUC switches of the partial converters connected in parallel in an interleaved manner. That means, despite the intermittent operation of the individual partial converters, the charging current in the intermediate circuit capacitor does not return to zero.

The document EP 1 519 475 A1 discloses a step-up converter having a bypass path that runs parallel to the shunt branch having the SUC switch and, like the latter, branches off between the SUC inductor and the SUC diode. A bypass capacitor for the SUC switch is arranged in the bypass path, the bypass capacitor being connected in series with a diode in the bypass path. When the SUC switch is opened, the current can continue to flow via the diode to the bypass capacitor until the bypass capacitor has been charged to the same voltage as an output-side intermediate circuit capacitor of the step-up converter. Since the voltage applied across the SUC switch is predefined by the voltage applied across the bypass capacitor, the voltage increase across the SUC switch is limited. In order to discharge the bypass capacitor for the next switching-off operation and to supply the electrical energy stored in the bypass capacitor to the intermediate circuit capacitor, a discharge circuit having a controllable switch is provided. The switch of the discharge circuit is controlled in such a manner that it is closed when the SUC switch is closed before switching off the current.

US 2006/0274558 A1 discloses a step-up converter having a so-called snubber circuit. The step-up converter has two input terminals and two output terminals, an SUC inductor and an SUC diode being connected in series between the first input terminal and the first output terminal, and a shunt branch having an SUC switch branching off between the SUC inductor and the SUC diode. The snubber circuit has a path comprising a first diode, a second diode and an inductor that are connected in series between the first output terminal and the second input terminal of the step-up converter. The inductor of the snubber circuit is magnetically coupled to the SUC inductor, and the forward directions of the two diodes of the snubber circuit are the same. The snubber circuit also has a capacitor that is connected in series with the first diode of the snubber circuit between the first output terminal of the step-up converter and a node between the SUC inductor and the SUC diode. When the SUC switch is closed, the magnetic coupling of the inductor to the SUC inductor causes a current flow in the first path of the snubber circuit that charges the capacitor, the polarity of the resulting voltage across the capacitor being opposite to the polarity of the voltage across an intermediate circuit capacitor between the output terminals. When the SUC switch is opened again, the interrupted current flows to the capacitor, as a result of which the latter is discharged. Since the voltage applied across the SUC switch cannot exceed the difference between the voltage applied between the output terminals and the voltage applied across the capacitor, the occurrence of overvoltages at the SUC switch is counteracted.

In a conventional step-down converter, an SDC switch is connected in series with an SDC inductor in one of two lines connected to a DC voltage source. Downstream of the SDC inductor, an intermediate circuit capacitor is connected between the two lines, to which intermediate circuit capacitor an output voltage, which has been reduced in comparison with its input voltage by the step-down converter, is applied. Between the SDC switch and the SDC inductor, a shunt branch, in which an SDC diode is arranged, leads from the one line to the other line. Closing the SDC switch causes the flow of a limited current, which energizes the SDC inductor, through the SDC inductor to one side of the intermediate circuit capacitor. After the SDC switch has been opened, this energy is output via the SDC diode in order to charge the intermediate circuit capacitor further.

A step-up converter is known from US 2006/0262577 A1. Here, a saturable inductor is connected between the SUC inductor and the SUC diode and downstream of the shunt branch having the SUC switch. A discharge circuit for a bypass capacitor connected in series with a diode and in parallel to the SUC switch has an inductor that is connected to the same connection of the bypass capacitor as the diode connected in series therewith, and a further diode connected in series with the inductor. The two diodes have forward directions that are opposite one another, as seen from the bypass capacitor. The further diode leads, on the one hand, to a resonant capacitor, which forms a series resonant circuit together with the bypass capacitor and the inductor and the other end of which is connected between the saturable inductor and the SUC diode, and, on the other hand, to a discharge diode that is connected to the output of the step-up converter downstream of the SUC diode. The bypass capacitor is charged when the SUC switch is opened and is discharged into the resonant capacitor within half a resonance period of the series resonant circuit while the SUC switch is closed. The resonant capacitor, from which the charge cannot flow back to the bypass capacitor due to the interposed further diode, is discharged when the SUC switch is opened again, in which case the bypass capacitor is then also charged again.

SUMMARY

The disclosure is directed to a converter having improved efficiency, in particular also with respect to switch-off losses in the converter switch during intermittent operation, and having a simpler construction.

The converter according to the disclosure has a bypass circuit for its converter switch that is connected in parallel with the converter switch and in which a bypass capacitor is connected in series with a diode. A discharge circuit having an inductor magnetically coupled to the converter inductor is provided for the bypass capacitor.

As a result of the fact that the discharge circuit has the inductor magnetically coupled to the converter inductor, the bypass capacitor is discharged via the discharge circuit in a passively controlled manner when the converter switch is closed. As a result of the fact that the inductor is magnetically coupled to the converter inductor, when the current begins to flow through the converter inductor upon closing of the converter switch, a current flow is also caused through the inductor of the discharge circuit and results in the bypass capacitor being discharged. In particular, the bypass capacitor can thus also be discharged against a voltage from the output or input intermediate circuit, which voltage is applied across the bypass capacitor and the discharge circuit.

According to the disclosure, it was recognized that there is no need to provide an actively controllable discharge circuit for discharging the bypass capacitor, but rather the bypass capacitor can be discharged as well using a passively controlled discharge circuit. In order to discharge the bypass capacitor, the converter according to the disclosure can therefore do without, for example, an actively controlled switch, such as an IGBT switch, in the discharge circuit. There is then also no need for a control signal or a control circuit for such a switch in order to control when a current is intended to flow in the discharge circuit and, thus, when the bypass capacitor is intended to be discharged. The passively controlled discharge circuit therefore makes it possible, in particular, to control the converter in a simple manner overall.

When the converter switch of the converter is opened, while a current flows through the associated converter inductor, the current flowing through the converter inductor can flow via the diode of the bypass circuit, the forward direction of which is the same as a regular direction of flow of the current through the converter switch, to the bypass capacitor until the bypass capacitor has been charged to the same voltage as an output-side or input-side intermediate circuit capacitor of the converter. Since the voltage across the converter switch is defined by the voltage across the bypass capacitor, the voltage increase across the converter switch is limited. In particular, voltage peaks are avoided. The time until the bypass capacitor has been charged to the same voltage as the output-side or input-side intermediate circuit capacitor is sufficiently long to considerably reduce the switch-off losses in the converter switch. However, this time is available, that is to say switch-off losses can be effectively reduced, only if the bypass capacitor is in a discharged state, that means, has been discharged before, upon opening of the converter switch.

The discharge circuit is provided for the purpose of discharging the bypass capacitor. The discharge circuit is designed in such a manner that the bypass capacitor is automatically discharged when the converter switch is closed. The bypass circuit is then short-circuited via the converter switch, with the result that there is no voltage across the circuit. In contrast, as long as the converter switch is open, there is at least some of the input voltage or output voltage of the converter across the bypass circuit.

It is not desired for the bypass capacitor to be discharged also via the converter switch when the latter is closed and this is prevented by the diode of the bypass circuit: in a circuit from one connection of the bypass capacitor, via the diode and the converter switch, to the other connection of the bypass capacitor, the forward direction of the diode is opposite the regular direction of current flow through the converter switch. A current flow in this circuit, which could be driven by the voltage across the charged bypass capacitor, is thus blocked by the diode of the bypass circuit. In other words, when the converter switch is closed, that is to say when the bypass circuit has been short-circuited and there is no voltage across the bypass circuit, a voltage drops across the diode and is opposite the voltage that drops across the bypass capacitor, as a result of which a current flow, which is driven by the voltage across the bypass capacitor, is blocked by the diode of the bypass circuit.

A switching element that is connected in series with the inductor in the discharge circuit and has a unidirectional flow direction, wherein the unidirectional flow direction of the switching element is opposite the forward direction of the diode of the discharge circuit, as seen from the bypass capacitor, ensures that the bypass capacitor can be discharged via the discharge circuit and the output intermediate circuit or an input intermediate circuit of the converter, while a current flow is prevented in the opposite direction. In many embodiments of the converter according to the disclosure, a passive switching element with a unidirectional flow direction suffices, that is to say, in particular, a further diode, the forward direction of which is then opposite the forward direction of the diode of the discharge circuit, as seen from the bypass capacitor.

In one embodiment, if the switching element with a unidirectional flow direction is implemented as an actively controlled auxiliary switch, the latter must be of the reverse blocking type or must discretely include a transistor and a diode connected in series with the latter. The active control of such an auxiliary switch can be achieved easily in the converter according to the disclosure by switching on the auxiliary switch synchronously with the converter switch and by switching it off again together with the converter switch or at least after the bypass capacitor has been discharged.

The converter inductor and the inductor of the discharge circuit, which is magnetically coupled to the converter inductor, may be implemented as air-core inductors. In comparison with the use of inductors with cores, this results in reduced noise production at switching frequencies in the audible range, a reduced remagnetization loss at all switching frequencies and an advantage in terms of weight in any case. For example, the inductor of the discharge circuit may be implemented as a type of auxiliary winding on the converter inductor in the form of an air-core inductor.

In principle, any desired order of the bypass capacitor and the diode in a bypass path of the bypass circuit is possible. However, the bypass capacitor and the diode may be arranged in the bypass path in such a manner that the diode is connected to a connection of the converter switch, via which the converter switch is connected to the converter diode.

No further electrical components need to be provided between the converter switch and the diode of the bypass circuit. Therefore, the converter switch and the diode of the bypass circuit may be arranged spatially close to one another. In a particularly compact embodiment of the converter according to the disclosure, the components are implemented in a common semiconductor component. This way a particularly good, that is to say largely loss-free and/or low-inductance, electrical connection between the converter switch and the diode and accordingly particularly good coupling of the bypass path is achieved. Switch-off losses when opening the converter switch can therefore be counteracted particularly well.

If the diode is connected to that connection of the converter switch that is connected to the connection of the converter diode, the converter diode can also be implemented in the common semiconductor component in addition to the converter switch and the diode of the bypass circuit.

A plurality of partial converters may be provided in the converter according to the disclosure. These partial converters may be connected in parallel, for example, between a common input and a common output intermediate circuit. However, the partial converters may also form a so-called symmetrical converter in which the partial converters are arranged in pairs in a mirror-image manner with respect to a center point of a common DC voltage intermediate circuit, apart from the directions of current flow through the converter switches and the forward directions through the diodes. If a plurality of partial converters are provided, each partial converter may have its own converter switch, its own converter inductor, its own converter diode and its own bypass capacitor for the converter switch and its own discharge circuit with an inductor. In order to ensure in this case that the respective bypass capacitor is discharged in a passively controlled manner via the discharge circuit assigned to it, but is not discharged in a passively controlled manner via the discharge circuit of another partial converter, the inductors of the discharge circuits and the converter inductors of the various partial converters should each be magnetically coupled separately from one another. The closing of the converter switch of a partial converter and the beginning of a current flow through the associated converter inductor then only cause a current flow through the inductor of the associated discharge circuit and therefore only discharge the bypass capacitor assigned to this partial converter.

If the converter has a plurality of partial converters, a controller may be provided and controls each converter switch for intermittent operation of the respective partial converter. In this case, the advantages of minimized switch-on losses at the converter switches and the overall minimized switching losses at the converter diodes, as already known from the prior art, are achieved. In the converter according to the disclosure, the bypass capacitor also reduces the switch-off losses at the converter switch. Provision may also be made for the controller to control the converter switches of a plurality of partial converters in an offset manner, thus making it possible to minimize the ripple of the current flowing in the output intermediate circuit overall.

In one specific embodiment, the converter according to the disclosure is a step-up converter. The converter inductor and the converter diode are then the SUC inductor and the SUC diode of the step-up converter and the converter switch is the SUC switch of the step-up converter that is arranged in a shunt branch branching off between the SUC inductor and the SUC diode. The bypass circuit having the bypass capacitor and the diode is connected in parallel with the SUC switch. If the discharge circuit for the bypass capacitor has a discharge path that branches off between the diode of the bypass path and the bypass capacitor and is connected to an output-side connection of the SUC diode, it can easily be achieved that the bypass capacitor is discharged via the output intermediate circuit of the step-up converter. The energy stored in the meantime by the bypass capacitor can thus be supplied to the output intermediate circuit and is therefore not lost.

Specifically, a converter according to the disclosure in the form of a step-up converter may be a step-up converter that is symmetrical with respect to a center point. This converter then has a second SUC inductor, a second SUC diode connected in series with the second SUC inductor, a second SUC switch that is arranged in a shunt branch branching off between the second SUC inductor and the second SUC diode, a second bypass circuit that is connected in parallel with the second SUC switch and in which a second bypass capacitor is connected in series with a second diode, wherein the forward direction of the second diode is the same as a regular direction of current flow through the second SUC switch, and a second discharge circuit for the second bypass capacitor. The second discharge circuit has a second discharge path that branches off between the second diode and the second bypass capacitor and is connected to an output-side connection of the second SUC diode and in which a second inductor is arranged.

The second inductor of the second discharge circuit may in this case be magnetically coupled to the SUC inductor, the second SUC inductor and the inductor of the discharge circuit. In comparison with a known step-up converter that is symmetrical with respect to a center point and has coupled SUC inductors, two bypass circuits having inductors that are included in the magnetic coupling of the SUC inductors are then additionally provided. However, in this case, a voltage is induced in the respective inductor on account of the magnetic coupling not only when the respective bypass capacitor is intended to be discharged with the aid of the respective inductor of the assigned discharge circuit. Therefore, in the case of such a symmetrical step-up converter according to the disclosure, the discharge circuit has an auxiliary switch that is connected in series with its inductor and is switched on synchronously with the SUC switch, and the second discharge circuit has a second auxiliary switch that is connected in series with the second inductor and is switched on synchronously with the second SUC switch. These auxiliary switches are embodiments of the switching element with a unidirectional flow direction that has already been discussed.

Another embodiment of a converter according to the disclosure in the form of a step-up converter is a so-called Dual-X step-up converter. The latter has a second SUC inductor, a second SUC diode connected in series with the second SUC inductor and a second SUC switch that is arranged in a shunt branch branching off between the second SUC inductor and second SUC diode and is connected in series with the SUC switch via a center point. The bypass circuit according to the disclosure is in this case also connected in parallel with the second SUC switch by virtue of it being connected to that connection of the SUC switch via which the SUC switch is connected to the SUC diode and to that connection of the second SUC switch via which the second SUC switch is connected to the second diode. The inductor of the discharge circuit according to the disclosure is magnetically coupled both to the SUC inductor and to the second SUC inductor. When load relieving both the SUC switch and the second SUC switch, the bypass capacitor of the bypass circuit is charged in the same direction. The next time one of the two SUC switches is switched on, the bypass capacitor is discharged again via the magnetically coupled inductor of the discharge circuit. In case of an exactly simultaneous clocking of the two SUC switches, the bypass circuit and the discharge circuit behave as if only one SUC switch was present. If the two SUC switches do not open and close at exactly the same time with synchronous clocking, as is carried out in a Dual-X step-up converter with magnetically coupled SUC inductors, each of the two SUC switches that switches off a current is bypassed in any case and the bypass capacitor is discharged as soon as a current flows through one or both of the SUC inductors again when the SUC switches are closed again.

In another specific embodiment, the converter is a step-down converter having an SDC switch and an SDC inductor connected in series with the SDC switch, and a shunt branch in which an SDC diode is arranged branching off between the SDC switch and the SDC inductor. In this case, the SDC switch, the SDC inductor and the SDC diode constitute the converter switch, the converter inductor and the converter diode. The bypass circuit in which the bypass capacitor is connected in series with the diode is provided parallel to the SDC switch, wherein the forward direction of the diode of the bypass path is the same as the regular direction of current flow through the SDC switch. The interrupted current can flow to the bypass capacitor via the bypass path (similar to the above embodiments) for a certain time after the SDC switch has been opened, thus charging the bypass capacitor. Switch-off losses in the SDC switch can therefore be reduced. However, this can be effected only if the bypass capacitor has been discharged before. For this purpose, the step-down converter according to the disclosure has the passively controlled discharge circuit for the bypass capacitor. The discharge circuit of the step-down converter according to the disclosure is in this case designed in such a manner that the bypass capacitor is discharged via an input intermediate circuit of the step-down converter upon closing of the SDC switch.

In order to make it possible to discharge the bypass capacitor via the input intermediate circuit, in one embodiment the discharge circuit of the step-down converter has a discharge path that branches off between the bypass capacitor and the diode, like in the step-up converter. Unlike in the step-up converter in which the capacitor is discharged via an output intermediate circuit, the discharging is carried out in the case of the step-down converter via an input intermediate circuit. For this purpose, the discharge path is connected to an input-side connection of the SDC diode in the case of the step-down converter.

In the use of a converter in accordance with one embodiment, in particular a step-up converter or a step-down converter, wherein the bypass capacitor is charged when the converter switch is opened, such that a voltage increase across the converter switch is limited, the converter switch is opened again only when the bypass capacitor has been discharged to a predefined residual voltage of no more than 25% of an intermediate circuit voltage of the output or input intermediate circuit. This ensures that it is possible to charge the bypass capacitor upon opening of the converter switch and switch-off losses can therefore be reduced. It is also possible to achieve the situation in which the bypass capacitor has been sufficiently discharged such that the current can flow to the bypass capacitor when the converter switch is opened by waiting for a predefined minimum period before the converter switch is opened, which minimum period is determined by a discharge constant for discharging the capacitor. In particular, this discharge constant is dependent on the capacitance of the bypass capacitor, the inductance, in particular the leakage inductance of the inductor of the bypass path, the magnetic coupling of the inductor of the bypass path to the converter inductor and/or its winding ratio.

Advantageous developments of the disclosure emerge from the patent claims, the description and the drawings. The advantages of features and combinations of a plurality of features, as mentioned in the description, are only examples and can come into effect alternatively or cumulatively without the advantages necessarily having to be achieved by embodiments according to the disclosure. Without changing the subject matter of the enclosed patent claims thereby, the following applies to the disclosure content of the original application documents and the patent: further features can be gathered from the drawings. It is likewise possible to combine features from different embodiments of the disclosure or features from different patent claims, in a manner deviating from the selected dependency references of the patent claims, and this is hereby suggested. This also relates to those features that are illustrated in separate drawings or are mentioned in the description of the drawings. These features can also be combined with features from different patent claims. Features cited in the patent claims may likewise be dispensed with for further embodiments of the disclosure. The features mentioned in the patent claims and in the description should be understood, in terms of their number, such that precisely this number or a number larger than the number mentioned is present without this requiring explicit use of the adverb "at least". If, thus, for example, an SUC switch is referred to, this should be understood as meaning that precisely one SUC switch, two SUC switches or more SUC switches are present. These features can be supplemented with other features or may be the only features of which the respective product consists. The reference symbols contained in the patent claims do not restrict the scope of the subject matters protected by the patent claims. They only serve the purpose of making the patent claims more easily comprehensible.

BRIEF DESCRIPTION OF THE DRAWINGS

The disclosure is explained and described further below using embodiments illustrated in the figures.

DETAILED DESCRIPTION

The disclosure relates to a converter, in particular a step-up converter (SUC) or a step-down converter (SDC), having a converter inductor, a converter diode, a converter switch and a bypass circuit connected in parallel with the converter switch. The bypass circuit has a bypass capacitor and a diode connected in series with the bypass capacitor, wherein the forward direction of the diode is the same as a regular direction of current flow through the converter switch, and wherein a discharge circuit is provided for the bypass capacitor. The disclosure also relates to the use of such a converter.

Such a converter can be used, for example, for matching between a voltage provided by a photovoltaic generator and a voltage from an input intermediate circuit of an inverter that is used to feed electrical energy from the photovoltaic generator into an alternating current network. In this case, the converter may be provided for the purpose of setting the operating point of the photovoltaic generator given a constant input intermediate circuit voltage of the inverter in such a manner that the photovoltaic generator provides a maximum electrical power under the current operating conditions.

The bypass capacitor can be used to limit the voltage increase across the converter switch upon opening of the converter switch: the bypass capacitor can "buffer" the current that is interrupted though, but still flows upon opening of the converter switch, as a result of which the capacitor is charged. In this case, the voltage that builds up across the bypass capacitor determines the voltage applied across the open converter switch, that is to say a voltage increase predefined by the capacitance of the bypass capacitor is not exceeded. The discharge circuit discharges the bypass capacitor for the next time the converter switch is opened, the electrical energy stored in the bypass capacitor being supplied to an output intermediate circuit or to an input intermediate circuit of the converter.

Figure 1:
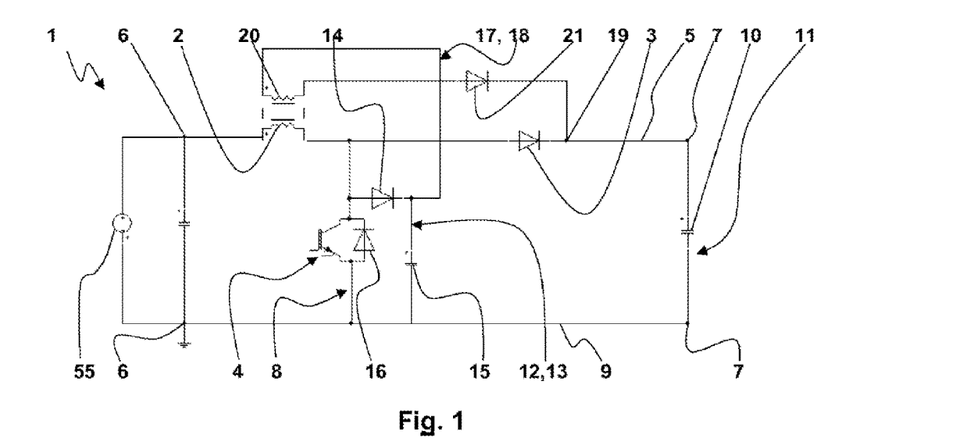
FIG. 1 shows a step-up converter according to the disclosure.

The step-up converter 1 according to the disclosure shown in FIG. 1 has an interconnection of an SUC inductor 2, an SUC diode 3 and an SUC switch 4 that is typical of a step-up converter. The SUC inductor 2 and the SUC diode 3 are connected in series in a line 5 between an input 6 and an output 7 of the step-up converter 1. The SUC switch 4 is arranged in a shunt branch 8 that leads from the line 5 to another line 9 that directly connects the input 6 to the output 7 here. An intermediate circuit capacitor 10, which forms an output intermediate circuit 11, and across which the output intermediate circuit voltage is applied is connected to the output 7 between the lines 5 and 9.

The step-up converter 1 additionally has a bypass circuit 12 having a bypass path 13 that runs parallel to the shunt branch 8 having the SUC switch 4 between the lines 5 and 9 and in which a diode 14 and a bypass capacitor 15 are connected in series. In the embodiment shown in FIG. 1, the diode 14 is arranged in the bypass path 13 upstream of the bypass capacitor 15. A spatially close arrangement of the SUC switch 4, the diode 14 and the SUC diode 3 is therefore achieved. In particular, the SUC switch 4 and the diode 14 may implemented in a common semiconductor component, wherein the SUC diode 3 then can also be implemented in this common semiconductor component.

The forward direction of the diode 14 of the bypass circuit 12 is the same as the regular direction of current flow through the SUC switch 4, as seen from the SUC inductor 2, and is therefore opposite the forward direction of a freewheeling diode 16 connected in parallel with the SUC switch 4. A current that is switched off by the SUC switch 4 can flow to the bypass capacitor 15 for a limited time via the diode 14 until the bypass capacitor has been charged to the same voltage as the intermediate circuit capacitor 10. This reduces a switch-off loss in the SUC switch 4. However, this is possible only if the bypass capacitor 15 is discharged again after each charging process. This can be carried out when the SUC switch 4 is closed, as a result of which the bypass circuit 12 is short-circuited and no voltage is therefore applied across the bypass path 13.

The diode 14 of the bypass circuit 12 prevents the bypass capacitor 15 from being able to be discharged via the diode 14 and the SUC switch 4 when the SUC switch 4 is closed: if the SUC switch 4 is closed, there is no voltage across the bypass circuit 12, in case that the bypass capacitor 15 is charged, this means, however, that a voltage drops across the diode 14, which voltage is opposite the voltage across the charged bypass capacitor 15. With the orientation of the forward direction of the diode 14 and of the regular direction of current flow through the SUC switch 4, as shown in FIG. 1, a current flow in a circuit from one connection of the bypass capacitor 15, via the diode 14 and the SUC switch 4, to the other connection of the bypass capacitor 15, which could be driven by the voltage across the charged bypass capacitor 15, is then blocked by the diode 14 of the bypass circuit 12.

A discharge circuit 17 is provided for the purpose of discharging the bypass capacitor 15. The discharge circuit has a discharge path 18 that branches off between the diode 14 and the bypass capacitor 15 and is connected to an output-side connection 19 of the SUC diode 3. The discharge circuit 17 comprises an inductor 20 magnetically coupled to the SUC inductor 2 and a further diode 21, wherein the forward directions of the diode 14 and of the further diode 21 are opposite one another, as seen from the bypass capacitor 15. The magnetic coupling of the inductor 20 to the SUC inductor 2 means that a current flow through the SUC inductor 2, which starts upon closing of the SUC switch 4, also causes a current flow through the inductor 20 in the forward direction of the further diode 21. The bypass capacitor 15 is discharged via the output intermediate circuit 11 this way. A passively controlled discharge of the bypass capacitor 15 is therefore achieved by closing the SUC switch 4.

In the embodiment illustrated in FIG. 1, the SUC inductor 2 and the inductor 20 are wound onto a common magnetic core with the same winding sense. However, passively controlled discharging would be achieved even if the inductors 2, 20 are wound onto the magnetic core with an opposite winding sense and the connections at the corresponding inductor 2, 20 are interchanged.

The time constant characteristic of the discharging of the bypass capacitor 15 is determined in this case by the capacitance of the bypass capacitor 15, the inductance of the inductor 20, the magnetic coupling of the inductor 20 to the SUC inductor 2 and/or its winding ratio. Waiting for a period that is greater than the characteristic time constant for discharging the bypass capacitor 15 before opening the SUC switch 4 it can be ensured that the bypass capacitor has been sufficiently discharged in order to be able to effectively reduce switch-off losses when opening the SUC switch 4.

The bypass capacitor 15 has its special importance when controlling the SUC switch 4 for intermittent operation of the step-up converter 1, in which case a large current is switched off by the SUC inductor 2 upon opening of the SUC switch 4. In this case, the bypass capacitor 15 ensures that the switch-off losses arising in the SUC switch 4 are reduced. During intermittent operation of the step-up converter 1, also the switch-on losses of the SUC switch 4 are minimized, just like the switch-off losses in the SUC diode 3.

Figure 2:
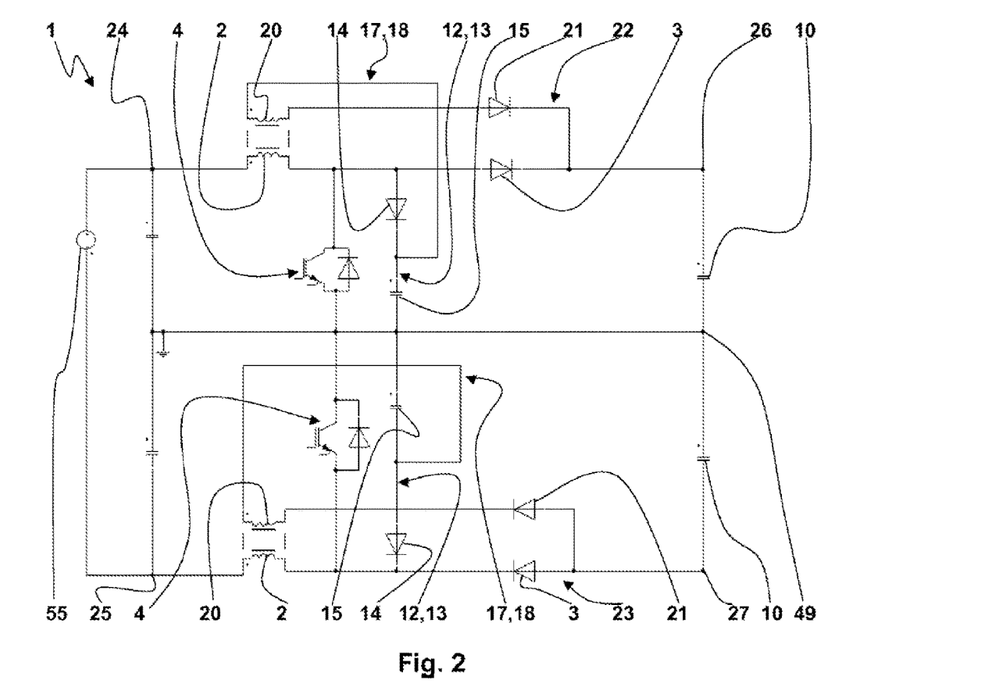
FIG. 2 shows a step-up converter according to the disclosure having a plurality of partial converters.

FIG. 2 shows an embodiment of the step-up converter 1 according to the disclosure in the form of a symmetrical step-up converter, here in an embodiment as a three-point step-up converter, in which the step-up converter 1 has a pair of partial converters 22, 23 that are connected between two input terminals 24, 25 of the step-up converter 1. The basic structure of a three-point step-up converter and its basic method of operation are known from the document DE 197 50 041 C1, for example, which is hereby incorporated by reference.

The basic structure of the individual partial converters 22, 23 respectively corresponds to the structure according to FIG. 1: each of the partial converters 22, 23 has an SUC inductor 2, an SUC diode 3 and an SUC switch 4 in a shunt branch 8. Further, a bypass circuit 12 having a diode 14 and a bypass capacitor 15 is provided for each partial converter 22, 23, wherein a discharge circuit 17 having an inductor 20 and a further diode 21 is assigned to each bypass capacitor 15. Two intermediate circuit capacitors 10 are provided between the output terminals 26, 27 of the step-up converter 1, wherein each of the two intermediate circuit capacitors 10 is assigned to one of the partial converters 22, 23. The intermediate circuit capacitors 10 form a common DC voltage intermediate circuit with a center point 49. In this case, the two partial converters 22, 23 are arranged in a mirror-image manner with respect to the center point 49, apart from the directions of current flow through their SUC switches 4 and the forward directions of their diodes 3, 14, 21.

By virtue of the fact that the inductors 20 and the SUC inductors 2 of the various partial converters 22, 23 are each magnetically coupled separately from one another, it is ensured that the discharge circuits 17 of the two partial converters 22, 23 for automatically discharging the bypass capacitors 15 when the SUC switch 4 of the respective partial converter 22, 23 is closed do not influence one another.

Figure 3:
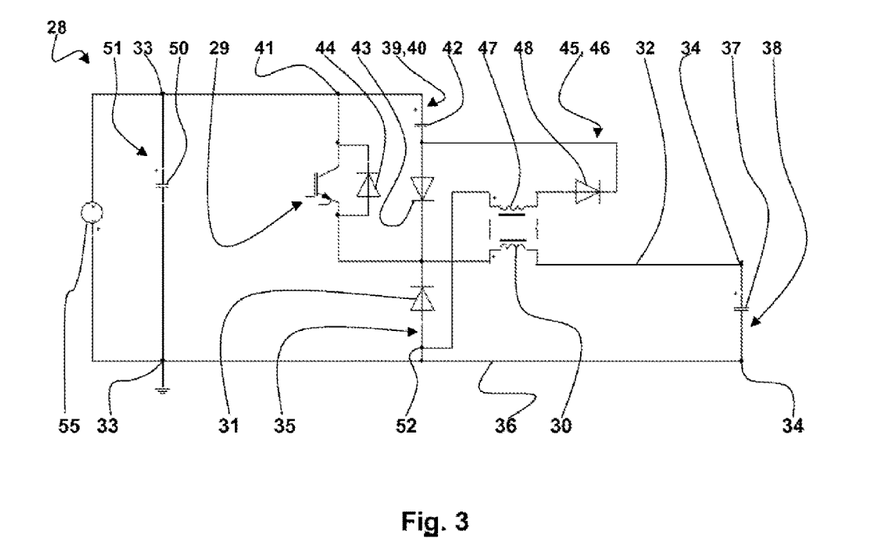
FIG. 3 shows a step-down converter according to the disclosure.

FIG. 3 shows a step-down converter 28 according to the disclosure, which has an interconnection of an SDC switch 29, an SDC inductor 30 and an SDC diode 31 that is typical of a step-down converter. The SDC switch 29 and the SDC inductor 30 are connected in series in a line 32 between an input 33 and an output 34 of the step-down converter 28. The SDC diode 31 is arranged in a shunt branch 35 that leads from the line 32 to another line 36 that directly connects the input 33 to the output 34. An intermediate circuit capacitor 37 is connected to the output 34 between the lines 32 and 36, which intermediate circuit capacitor 37 forms an output intermediate circuit 38 and across which an output intermediate circuit voltage is applied. An input intermediate circuit capacitor 50 that is used to form an input intermediate circuit 51 is connected to the input 33 between the lines 32 and 36.

The step-down converter 28 also has a bypass circuit 39 having a bypass path 40 that is connected in parallel with the SDC switch 29 and branches off from the line 32 upstream of an input-side connection 41 of the SDC switch 29 and is connected to the line 32 again between the SDC switch 29 and the SDC inductor 30. A bypass capacitor 42 and a diode 43 are connected in series in the bypass path 40 (as seen from the input-side connection 41), wherein the forward direction of the diode 43 is the same as the regular direction of current flow through the SDC switch 29 and therefore is opposite the forward direction of its freewheeling diode 44. A current that is switched off by the SDC switch 29 can therefore be conducted via the bypass path 40 for a limited time, thus charging the bypass capacitor 42. This reduces switch-off losses in the SDC switch 29.

In order to achieve that the bypass capacitor 42 is discharged again after each charging process, a discharge circuit 45 is provided for the bypass capacitor 42 via which the bypass capacitor 42 is discharged automatically, that means in a passively controlled manner, upon closing of the SDC switch 29. The discharge circuit 45 has a discharge path 46 that branches off between the bypass capacitor 42 and the diode 43 of the bypass path 40 and is connected to an input-side connection 52 of the SDC diode 31 and therefore to the line 36. An inductor 47 and a further diode 48 are connected in series in the discharge path 46, wherein the forward directions of the diode 43 and of the further diode 48 are opposite one another, as seen from the bypass capacitor 42. The inductor 47 is magnetically coupled to the SDC inductor 30. Upon closing of the SDC switch 29, a current begins to flow through the SDC inductor 30. On account of the magnetic coupling between the SDC inductor 30 and the inductor 47 of the discharge circuit 45, a current flow is therefore also caused through the inductor 47 and therefore through the discharge path 46 in the forward direction of the further diode 48. The current flow results in the bypass capacitor 42 being discharged via the input intermediate circuit 51. Waiting for a period that is greater than the characteristic time constant for discharging the bypass capacitor 42 before opening the SDC switch 29 again it can be ensured that the bypass capacitor has been sufficiently discharged in order to be able to be charged again upon opening of the SDC switch 29, with the result that the switch-off losses in the SDC switch 29 can be reduced.

Unlike the illustration in FIG. 3, the SDC inductor 30 and the inductor 47 may also be wound onto a common magnetic core with an opposite winding sense without impairing the function of the step-down converter 28 according to the disclosure if the connections of the corresponding inductor 30, 47 are interchanged.

Figure 4:
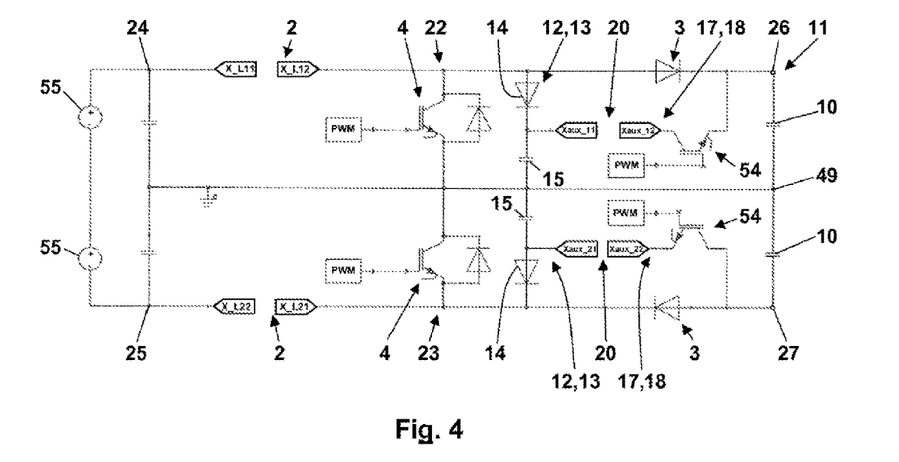
FIG. 4 shows a symmetrical step-up converter according to the disclosure.
Figure 5:
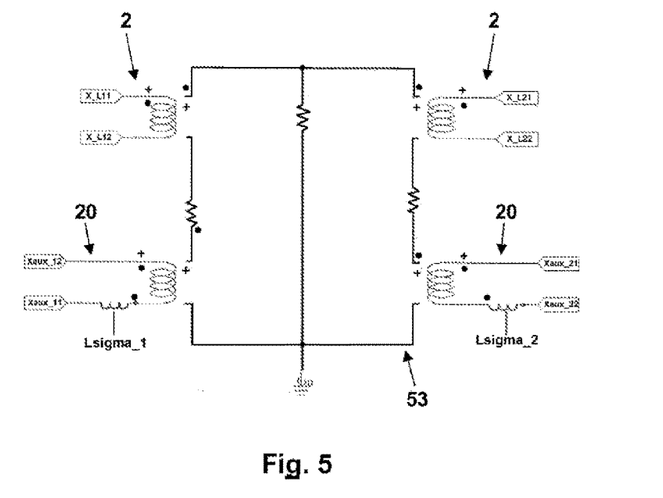
FIG. 5 shows the magnetic circuit of the symmetrical step-up converter according to FIG. 4.

The symmetrical step-up converter 1 according to the disclosure illustrated in FIG. 4 differs from the symmetrical step-up converter 1 illustrated in FIG. 2 in that the two SUC inductors 2 and therefore also the two inductors 20 are magnetically coupled to one another. The details of the magnetic coupling emerge from FIG. 5 in this case, which shows the magnetic circuit of the two SUC inductors 2 and of the two inductors 20. The magnetic circuit substantially corresponds to that in a symmetrical step-up converter with coupled SUC inductors without the bypass circuits 12. In comparison with the SUC inductors 2, the inductors 20 conduct only a small current and therefore do not influence the dimensioning of the core 53. Merely a sufficient leakage inductance between the SUC inductors 2 and the inductors 20 ($L\ sigma\_1/L\ sigma\_2$) needs to be taken into account for. Unwanted voltages are also induced in the inductors 20 as a result of the magnetic coupling between one inductor 20 of one partial converter 22, 23 and the SUC inductor 2 of the other partial converter 23, 22. In order to block a resulting unwanted current flow through the inductors 20, auxiliary switches 54 are connected in series with the inductors 20 in the discharge paths 18 instead of the further diodes 21. Like the diodes 20, these auxiliary switches 54 are basically implemented as switching elements with a unidirectional flow direction that can also be entirely blocked in order to additionally prevent unwanted current flows also in the unidirectional flow direction. For this purpose, the auxiliary switches 54 are switched on synchronously with the respective SUC switch 4 of the same partial converter 22 or 23 and are switched off either together with the switch or when the associated bypass capacitor 15 has been discharged as desired. The advantage of the embodiment of the symmetrical step-up converter 1 according to FIGS. 4 and 5 is a compact inductor device that is, in particular, lighter than in the embodiment according to FIG. 2.

Figure 6:
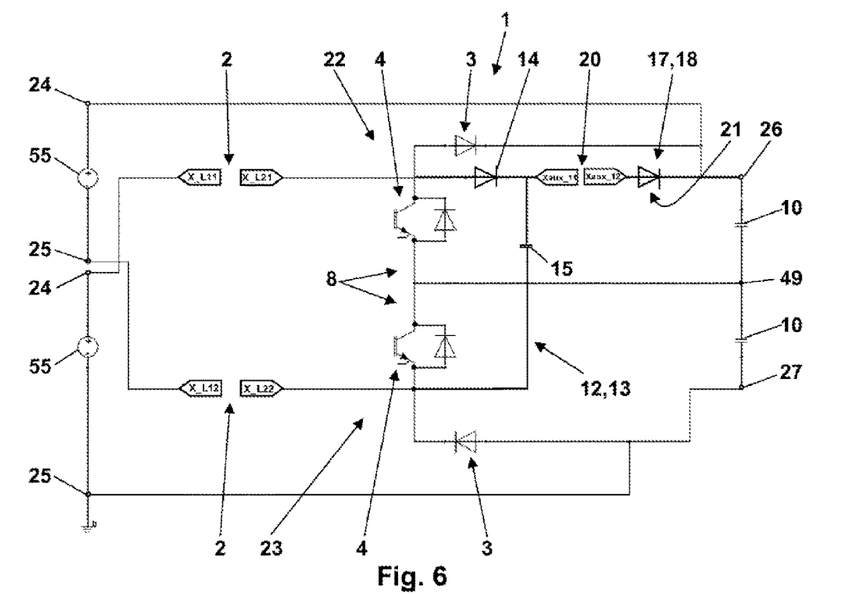
FIG. 6 shows a Dual-X step-up converter according to the disclosure.
Figure 7:
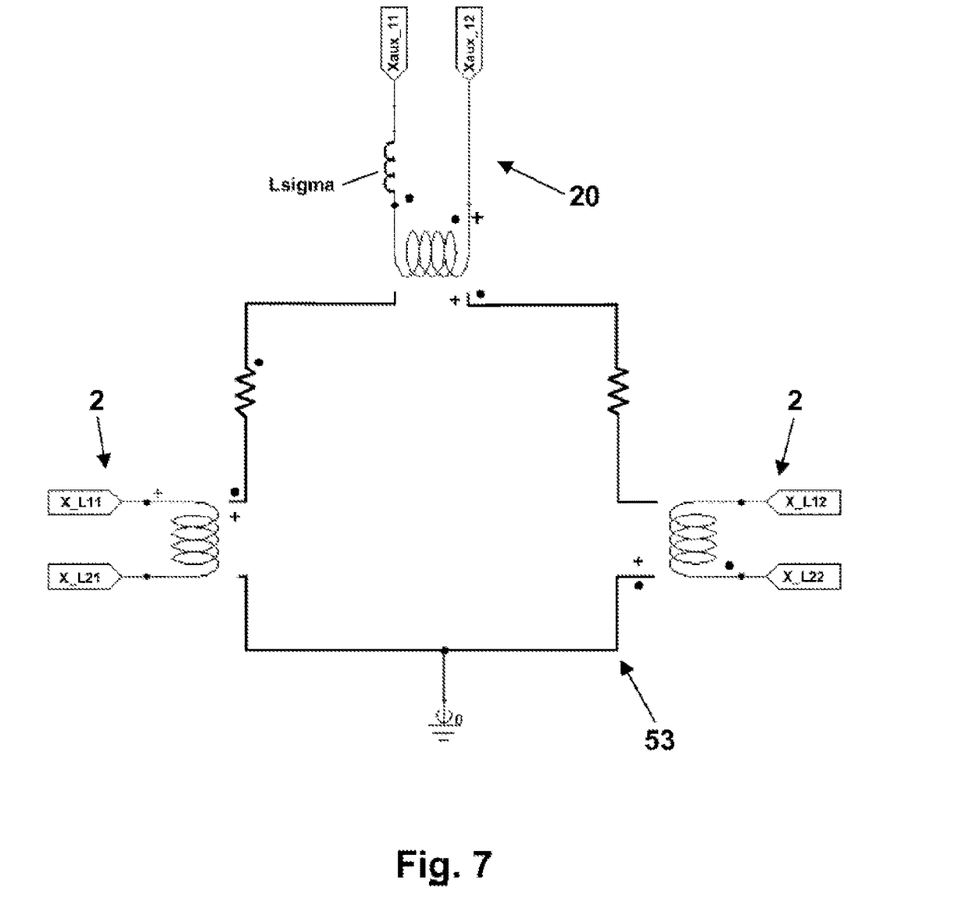
FIG. 7 shows the magnetic circuit of the Dual-X step-up converter according to FIG. 6.

The step-up converter 1 shown in FIG. 6 is a so-called Dual-X step-up converter with two pairs of input terminals 24 and 25 in order to connect two voltage sources 55 there in a parallel manner. A Dual-X SUC is basically known from DE 10 2010 006 124 A1, which is hereby incorporated by reference. Like the step-up converter 1 according to FIG. 4, the Dual-X step-up converter has two SUC inductors 2, two SUC diodes 3 and two SUC switches 4. Since the partial converters 22 and 23 constructed therewith overlap in the region of their shunt branches 8 and the two SUC switches 4 are clocked in a synchronous manner, a common bypass circuit 12 and also a common discharge circuit 17 having only one inductor 20 that is connected in series with the diode 21 in the discharge path 18 suffice here. In addition, a feedback of the bypass circuit 12 on a balancing for the series connection of the SUC switches 4 is avoided by the common bypass circuit 12 and the common discharge circuit 17. FIG. 7 sketches the magnetic circuit of the step-up converter 1 according to FIG. 6.

The invention claimed is:

1. A converter, comprising:
   a converter inductor;
   a converter diode;
   a converter switch, wherein the converter inductor, the converter diode and the converter switch operate together to receive an input voltage and generate a converted output voltage;
   a bypass circuit that is connected in parallel with the converter switch, the bypass circuit comprising a bypass capacitor connected in series with another diode, wherein a forward direction of the another diode is same as a regular direction of current flow through the converter switch; and
   a discharge circuit configured to discharge the bypass capacitor, the discharge circuit comprising another inductor,
   wherein the another inductor of the discharge circuit is magnetically coupled to the converter inductor,
   wherein the converter comprises a plurality of partial converters, each partial converter having a respective converter switch, a respective converter inductor, a respective converter diode, a respective bypass capacitor for the respective converter switch and a respective discharge circuit having a respective another inductor, and wherein the another inductors and the converter inductors of the different partial converters are each magnetically coupled separately from one another.

2. The converter as claimed in claim 1, wherein the another inductor of the discharge circuit is magnetically coupled to the converter inductor in such a manner that, when a current begins to flow through the converter inductor upon closing of the converter switch, a current flow through the another inductor of the discharge circuit is also initiated and results in the bypass capacitor being discharged.

3. The converter as claimed in claim 1, wherein the discharge circuit comprises a switching element that is connected in series with the another inductor and has a unidirectional flow direction, wherein the unidirectional flow direction of the switching element and the forward direction of the another diode are opposite one another, as seen from the bypass capacitor.

4. The converter as claimed in claim 3, wherein the switching element with a unidirectional flow direction comprises a further diode.

5. The converter as claimed in claim 1, wherein the converter inductor and the another inductor of the discharge circuit comprise air-core inductors.

6. The converter as claimed in claim 1, wherein the bypass capacitor and the another diode are arranged in the bypass circuit in such a manner that the another diode is connected to a connection of the converter switch via which the converter switch is connected to the converter diode.

7. The converter as claimed in claim 1, wherein the converter switch and the another diode of the bypass circuit are implemented in a common semiconductor component.

8. The converter as claimed in claim 1, further comprising a controller configured to control each converter switch for intermittent operation of a respective partial converter.

9. The converter as claimed in claim 1,
   wherein the converter comprises a step-up converter;
   wherein the converter inductor comprises a first SUC inductor;
   wherein the converter diode comprises a first SUC diode connected in series with the first SUC inductor;
   wherein the converter switch comprises a first SUC switch that is arranged in a shunt branch branching off between the first SUC inductor and the first SUC diode; and
   wherein the discharge circuit comprises a first discharge path that branches off between the another diode and the bypass capacitor and is connected to an output-side connection of the first SUC diode.

10. A converter, comprising:
    a converter inductor;
    a converter diode;
    a converter switch, wherein the converter inductor, the converter diode and the converter switch operate together to receive an input voltage and generate a converted output voltage;
    a bypass circuit that is connected in parallel with the converter switch, the bypass circuit comprising a bypass capacitor connected in series with another diode, wherein a forward direction of the another diode is same as a regular direction of current flow through the converter switch; and
    a discharge circuit configured to discharge the bypass capacitor, the discharge circuit comprising another inductor,
    wherein the another inductor of the discharge circuit is magnetically coupled to the converter inductor,
    wherein the converter comprises a step-up converter;
    wherein the converter inductor comprises a first SUC inductor;

wherein the converter diode comprises a first SUC diode connected in series with the first SUC inductor;

wherein the converter switch comprises a first SUC switch that is arranged in a shunt branch branching off between the first SUC inductor and the first SUC diode;

wherein the discharge circuit comprises a first discharge path that branches off between the another diode and the bypass capacitor and is connected to an output-side connection of the first SUC diode, and wherein the step-up converter comprises a symmetrical step-up converter that is symmetrical with respect to a center point, comprising a second SUC inductor, a second SUC diode connected in series with the second SUC inductor, a second SUC switch that is arranged in a shunt branch branching off between the second SUC inductor and the second SUC diode, a second bypass circuit that is connected in parallel with the second SUC switch and in which a second bypass capacitor is connected in series with a second diode, wherein the forward direction of the second diode is same as a regular direction of current flow through the second SUC switch, and a second discharge circuit for the second bypass capacitor, wherein the second discharge circuit has a second discharge path that branches off between the second diode and the second bypass capacitor and is connected to an output-side connection of the second SUC diode and in which a second inductor is arranged.

11. The converter as claimed in claim 10, wherein the first SUC inductor, the second SUC inductor, the another inductor of the discharge circuit and the second inductor of the second discharge circuit are magnetically coupled, and wherein the discharge circuit comprises an auxiliary switch that is connected in series with the another inductor of the discharge circuit and is switched on synchronously with the first SUC switch, and the second discharge circuit comprises a second auxiliary switch that is connected in series with the second inductor and is switched on synchronously with the second SUC switch.

12. The converter as claimed in claim 10, wherein the another inductor of the discharge circuit is magnetically coupled to the converter inductor in such a manner that, when a current begins to flow through the converter inductor upon closing of the converter switch, a current flow through the another inductor of the discharge circuit is also initiated and results in the bypass capacitor being discharged.

13. The converter as claimed in claim 10, wherein the discharge circuit comprises a switching element that is connected in series with the another inductor and has a unidirectional flow direction, wherein the unidirectional flow direction of the switching element and the forward direction of the another diode are opposite one another, as seen from the bypass capacitor.

14. The converter as claimed in claim 13, wherein the switching element with a unidirectional flow direction comprises a further diode.

15. A converter, comprising:
a converter inductor;
a converter diode;
a converter switch, wherein the converter inductor, the converter diode and the converter switch operate together to receive an input voltage and generate a converted output voltage;

a bypass circuit that is connected in parallel with the converter switch, the bypass circuit comprising a bypass capacitor connected in series with another diode, wherein a forward direction of the another diode is same as a regular direction of current flow through the converter switch; and a discharge circuit configured to discharge the bypass capacitor, the discharge circuit comprising another inductor, wherein the another inductor of the discharge circuit is magnetically coupled to the converter inductor, wherein the converter comprises a step-up converter;

wherein the converter inductor comprises a first SUC inductor;

wherein the converter diode comprises a first SUC diode connected in series with the first SUC inductor;

wherein the converter switch comprises a first SUC switch that is arranged in a shunt branch branching off between the first SUC inductor and the first SUC diode;

wherein the discharge circuit comprises a first discharge path that branches off between the another diode and the bypass capacitor and is connected to an output-side connection of the first SUC diode, and wherein the step-up converter comprises a Dual-X step-up converter, comprising:
a second SUC inductor,
a second SUC diode connected in series with the second SUC inductor,
a second SUC switch arranged in a shunt branch branching off between the second SUC inductor and the second SUC diode and connected in series with the first SUC switch via a center point,
wherein the bypass circuit is also connected in parallel with the second SUC switch by virtue of being connected to the connection of the SUC switch with the SUC diode and to the connection of the second SUC switch with the second SUC diode, and
wherein the first SUC inductor, the second SUC inductor and the another inductor of the discharge circuit are magnetically coupled.

16. The converter as claimed in claim 15, wherein the another inductor of the discharge circuit is magnetically coupled to the converter inductor in such a manner that, when a current begins to flow through the converter inductor upon closing of the converter switch, a current flow through the another inductor of the discharge circuit is also initiated and results in the bypass capacitor being discharged.

17. The converter as claimed in claim 15, wherein the discharge circuit comprises a switching element that is connected in series with the another inductor and has a unidirectional flow direction, wherein the unidirectional flow direction of the switching element and the forward direction of the another diode are opposite one another, as seen from the bypass capacitor.

18. The converter as claimed in claim 17, wherein the switching element with a unidirectional flow direction comprises a further diode.

* * * * *